Figure 1:
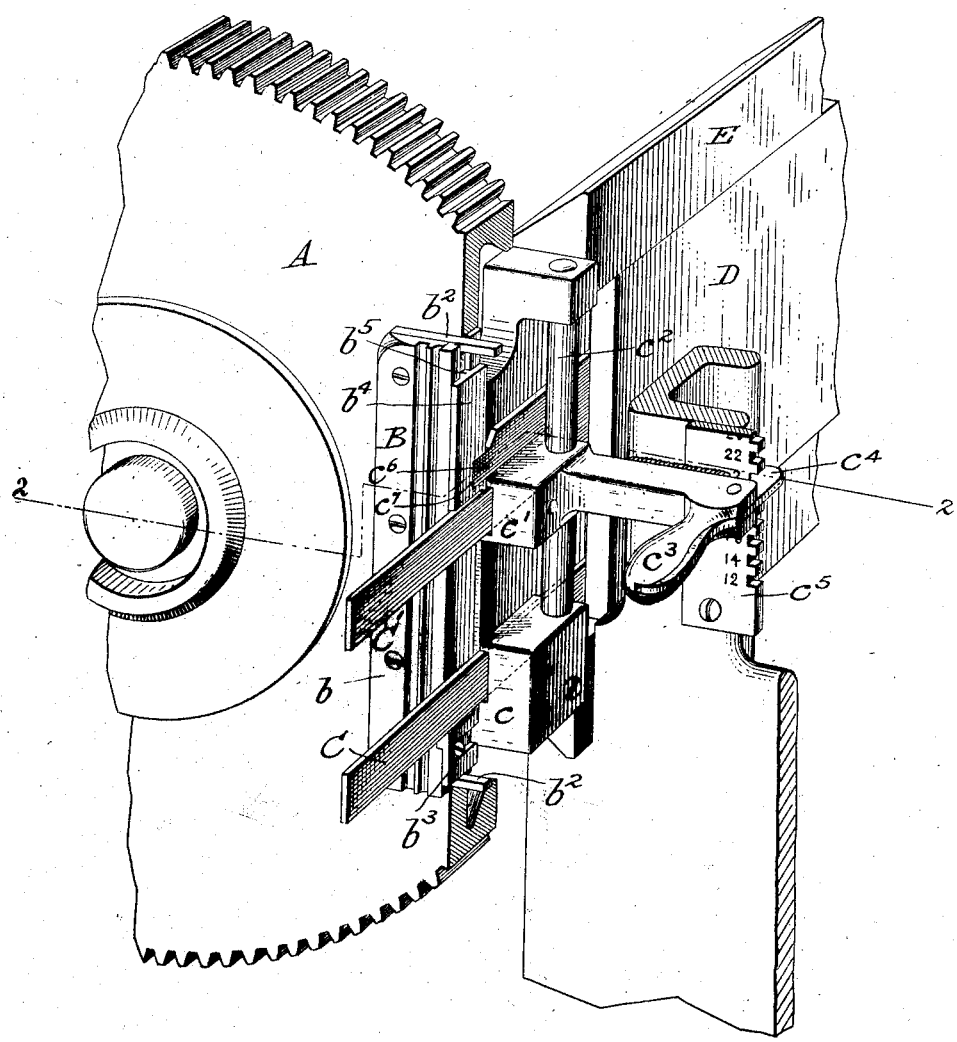

No. 865,086. PATENTED SEPT. 3, 1907.
P. T. DODGE.
LINOTYPE MACHINE.
APPLICATION FILED OCT. 26, 1906.

2 SHEETS—SHEET 1.

Witnesses
Inventor

No. 865,086. PATENTED SEPT. 3, 1907.
P. T. DODGE.
LINOTYPE MACHINE.
APPLICATION FILED OCT. 26, 1906.
2 SHEETS—SHEET 2.
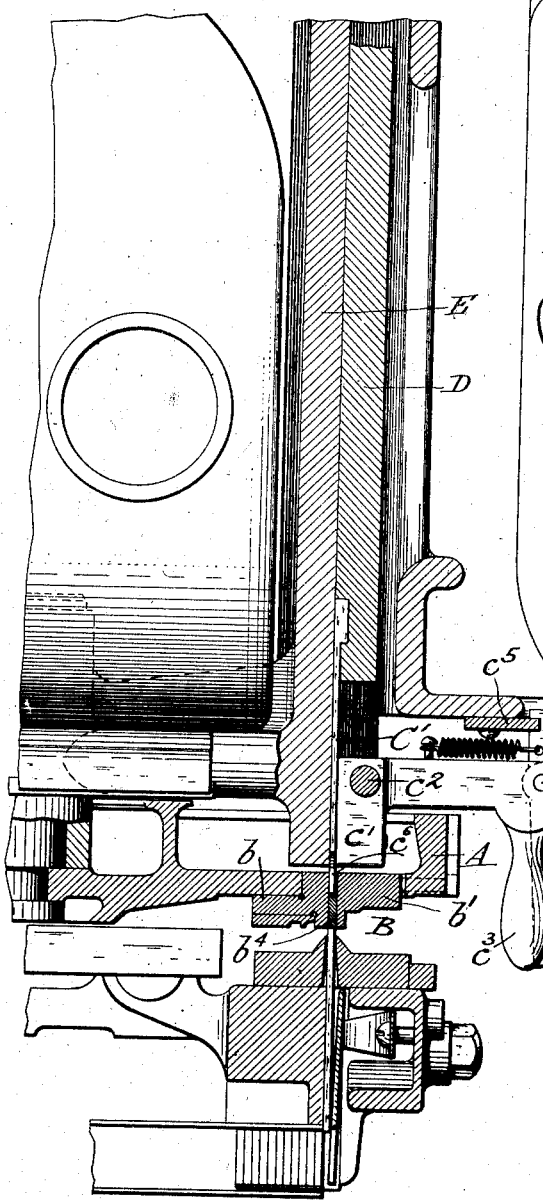
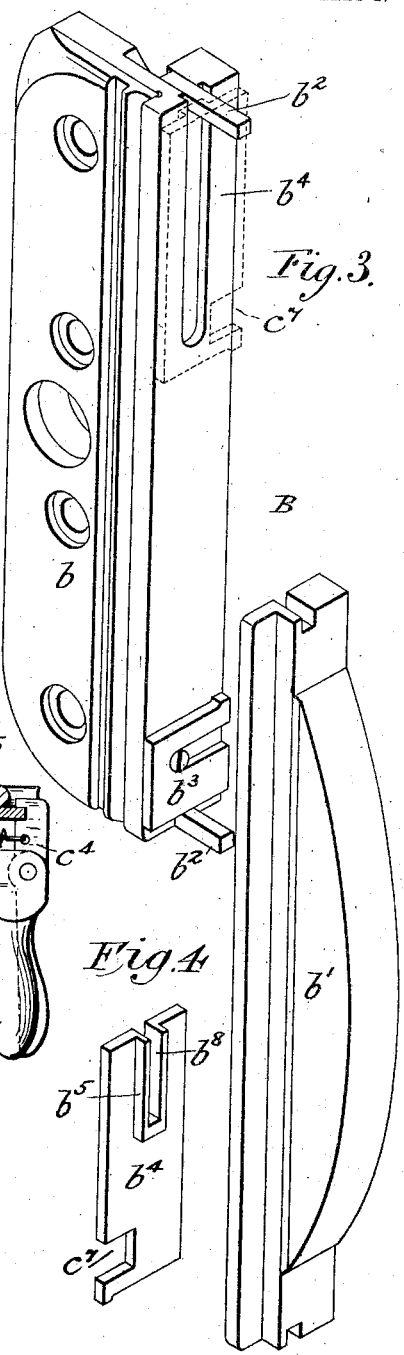
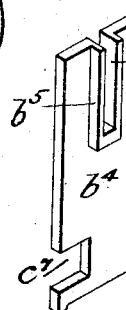
Witnesses
Inventor

UNITED STATES PATENT OFFICE.

PHILIP T. DODGE, OF WASHINGTON, DISTRICT OF COLUMBIA, ASSIGNOR TO MERGENTHALER LINOTYPE COMPANY, A CORPORATION OF NEW YORK.

LINOTYPE-MACHINE.

No. 865,086.　　　　　Specification of Letters Patent.　　　　Patented Sept. 3, 1907.

Application filed October 26, 1906. Serial No. 340,770.

To all whom it may concern:

Be it known that I, PHILIP T. DODGE, of the city of Washington, District of Columbia, have invented a new and useful Improvement in Linotype-Machines, of which the following is a specification.

My invention has reference to linotype machines such as shown in Letters Patent of the United States No. 436,532, and kindred machines generally known under the trade mark "Linotype", wherein printing slugs or linotypes are cast in a slotted mold against the line of matrices temporarily presented to the face of the mold, these slugs being finally delivered from the mold by an ejector blade passing through the same from the rear.

My invention consists broadly in the combination of a mold, having its slot adjustable or variable in length, with an ejector variable in width, the two being connected for simultaneous adjustment.

I prefer to employ a mold having one end of the slot formed by a longitudinally sliding liner, and to combine therewith an ejector consisting of two longitudinal blades or fingers, one of which is movable laterally in relation to the other, so that they may be adjusted at different distances apart corresponding to the various lengths of the mold, and I prefer to adjust the mold liner by means of a movable guide, in which one of the ejector blades or fingers is carried. Molds adjustable in length are, however, known in various forms, and it is to be understood that an adjustable mold of any suitable type will be combined with a variable liner of any appropriate construction, and that it may be connected directly or through intermediate parts, provided the adjustment of the mold is necessarily accompanied by a corresponding adjustment of the ejector.

Figure 1 represents a perspective view of my mechanism embodied in connection with the ejector, mold and mold-carrying wheel of a commercial linotype machine, one side of the wheel and the cap of the mold being removed to expose the other parts to view. Fig. 2 is a horizontal cross-section on the line 2—2 of the preceding figure, with the mold cap and the outer side of the carrying wheel in place. Fig. 3 is a perspective view showing the mold with its parts separated. Fig. 4 is a view of the sliding liner.

Referring to the drawings, A represents an upright intermitingly rotated wheel or disk, and B the slotted mold secured rigidly therein. In the form shown, the mold consists of the body portion $b$, the cap portion $b'$, the guides or arms $b^2$, connecting the cap and body, and the two liners $b^3$ and $b^4$ seated between the cap and body and forming the ends of the slot or mold cell in which the slug or linotype is cast, as usual. The liner $b^4$ is free to slide endwise in order to vary the length of the slot existing between it and the liner $b^3$, and the consequent length of the slug produced in the machine. The liner may be guided in any suitable manner; for example, by a rib $b^6$ formed thereon, as shown in Fig. 4, at one end, and arranged to slide in a corresponding groove in the body of the mold.

The ejector consists of two parallel blades or fingers C, C', connected at their rear ends to the horizontal slide D, by which they may be projected forward through the mold in order to expel the slug therefrom. The lower blade C is mounted in a stationary guide $c$, while the upper blade C' is mounted in a vertically movable guide $c'$, mounted on a vertical post $c^2$, which is in turn supported at its ends in studs or projections on the horizontal slide E, having an arm which carries the mold wheel A, as usual.

The upper ejector guide $c'$ is formed with an operating handle $c^3$, and with a pivoted latch $c^4$, which engages a vertically notched plate $c^5$. These devices admit of the guide $c'$ and the blade C' being raised and lowered at will, so that the distance between the outer edges of the blade C and C' will be equal to the length of the mold and of the slugs which are, for the time being, produced in the machine.

To the upper ejector blade C' I secure the finger or projection $c^6$, arranged to enter a notch $c^7$, formed for the purpose in the rear edge of the sliding liner $b^4$, as shown in Figs. 3 and 4. When the ejector slide D moves forward, this projection enters the notch in the liner in the manner shown in Fig. 1, so that if the liner blade C' be adjusted upward or downward, it will carry the liner $b^4$ with it. In other words, the liner and the blade will be raised and lowered simultaneously, and thus the ejector and the mold adapted to operate one with the other whatever the length of the line produced.

When slugs of moderate length are to be cast in the mold, I employ a solid liner, such as shown in Fig. 1, and when slugs of extreme length are required, I substitute therefor a liner slotted as shown at $b^8$ Fig. 4, so that it may straddle the end guide $b^2$ and move outward at one end beyond the end of the mold body.

I believe it to be broadly new in the art to connect or combine an adjustable ejector and an adjustable mold in any manner or by any means which will compel their corresponding adjustments.

I lay no claim herein to the ejector consisting of two relatively adjustable blades or fingers, this being the invention of another.

Having described my invention, what I claim is:—

1. In a linotype machine, a slotted mold variable in length, an ejector variable in width, and connecting means to insure like adjustment of the mold and ejector.

2. In a linotype machine, a mold variable in length, an ejector variable in width, and common means for adjusting the ejector and the mold.

3. In a linotype machine, a mold provided with a slotted liner, an ejector blade, a movable guide for the latter, means combined with the ejector blade for effecting the longitudinal adjustment of the liner.

4. In a linotype machine, a mold having a longitudinal liner, in combination with the adjusting means movable transversely into engagement with the liner at the rear, and thereafter movable in the direction of the length of the liner to cause the adjustment of the latter.

5. In a linotype machine, in combination with the sliding mold liner $b^4$, the longitudinally and laterally movable ejector blade $C'$ and finger $c^6$ arranged to engage the liner.

In testimony whereof I hereunto set my hand this twenty-second day of October, 1906, in the presence of two attesting witnesses.

PHILIP T. DODGE.

Witnesses:
F. M. EGGLESTON,
WALTER MORLARD.